United States Patent
Bai et al.

(10) Patent No.: US 10,841,952 B2
(45) Date of Patent: Nov. 17, 2020

(54) PUNCTURING PT-RS BASED ON A COLLISION BETWEEN PT-RS AND CORESET

(71) Applicant: QUALCOMM Incorporated, San Diego, CA (US)

(72) Inventors: Tianyang Bai, Bridgewater, NJ (US); Tao Luo, San Diego, CA (US); Alexandros Manolakos, San Diego, CA (US); Jae Won Yoo, San Diego, CA (US); Hari Sankar, San Diego, CA (US); Joseph Binamira Soriaga, San Diego, CA (US); Amir Aminzadeh Gohari, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 143 days.

(21) Appl. No.: 16/224,021

(22) Filed: Dec. 18, 2018

(65) Prior Publication Data
US 2019/0230708 A1   Jul. 25, 2019

Related U.S. Application Data

(60) Provisional application No. 62/621,801, filed on Jan. 25, 2018.

(51) Int. Cl.
*H04W 74/08* (2009.01)
*H04W 72/04* (2009.01)
(Continued)

(52) U.S. Cl.
CPC ...... *H04W 74/0816* (2013.01); *H04L 1/0013* (2013.01); *H04L 5/0048* (2013.01); *H04L 5/0053* (2013.01); *H04W 72/0406* (2013.01)

(58) Field of Classification Search
None
See application file for complete search history.

(56) References Cited

U.S. PATENT DOCUMENTS

| 2019/0140729 A1* | 5/2019 | Zhang | H04B 7/063 |
| 2019/0296877 A1* | 9/2019 | Zhang | H04W 72/042 |
| 2020/0067676 A1* | 2/2020 | Yi | H04W 72/04 |

OTHER PUBLICATIONS

International Search Report and Written Opinion—PCT/US2018/066565—ISA/EPO—dated Apr. 15, 2018.
(Continued)

*Primary Examiner* — Alex Skripnikov
(74) *Attorney, Agent, or Firm* — Shumaker & Sieffert, P.A.

(57) ABSTRACT

A transmitter, such as a base station, identifies a potential collision between a first set of resources configured for a CORESET for a receiver and a second set of resources configured for a PT-RS for the receiver. The apparatus may determine whether colliding resources in the CORESET are configured/used for a control transmission or a data transmission. The apparatus punctures the PT-RS based on whether the colliding resources in the CORESET are configured/used for the control transmission (e.g., PDCCH). For example, the apparatus may puncture the PT-RS only for resource blocks of the CORESET colliding with the control transmission without puncturing the PT-RS over an entire set of the colliding resources configured for the CORESET. A receiver may similarly identify potential collisions and determine whether PT-RS will be punctured based on whether the colliding resources in the CORESET are configured/used for a control transmission or a data transmission.

28 Claims, 15 Drawing Sheets

(51) Int. Cl.
*H04L 1/00* (2006.01)
*H04L 5/00* (2006.01)

(56) References Cited

OTHER PUBLICATIONS

Samsung: "Discussions on Multiplexing of Different Types of RSs for UL", 3GPP DRAFT; R1-1713600 UL RS MUX_VO, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017, Aug. 20, 2017 (Aug. 20, 2017), 3 Pages, XP051316400, Retrieved from the Internet: URL: http://www.3gpp.org/ftp/Meetings_3GPP_SYNC/RAN1/Docs/ [retrieved on Aug. 20, 2017], Sections1, 2.

Spreadtrum Communications: "Remaining Issues on DL RS Multiplexing", 3GPP Draft; R1-1719691_Remaining Issues on DL RS Multiplexing, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 17, 2017 (Nov. 17, 2017), 4 Pages, XP051368849, Retrieved from the Internet: URL: http://www.3gpp.org/ftp/Meetings_3GPP_SYNC/RAN1/Docs/ [retrieved on Nov. 17, 2017], Sections 2.

Spreadtrum Communications: "On DL RS Multiplexing", 3GPP Draft; R1-1715511_On DL RS Multiplexing_Final, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017 (Sep. 17, 2017), 7 Pages, XP051338978, Retrieved from the Internet: URL: http://www.3gpp.org/ftp/Meetings_3GPP_SYNC/RAN1/Docs/ [retrieved on Sep. 17, 2017], Sections 4.

Spreadtrum Communications: "On RS Multiplexing", 3GPP Draft; R1-1713051_On RS Multiplexing_Final, 3rd Generation Partnership Project (3GPP), Mobile Competence Centre; 650, Route Des Lucioles; F-06921 Sophia-Antipolis Cedex; France, vol. RAN WG1, No. Prague, Czech Rep; Aug. 21, 2017-Aug. 25, 2017, Aug. 20, 2017 (Aug. 20, 2017), 8 Pages, XP051315860, Retrieved from the Internet: URL: http://www.3gpp.org/ftp/Meetings_3GPP_Sync/Ran1/Docs/ [retrieved on Aug. 20, 2017], Sections 4-5.

* cited by examiner

PUNCTURING PT-RS BASED ON A COLLISION BETWEEN PT-RS AND CORESET

CROSS-REFERENCE TO RELATED APPLICATION

This application claims the benefit of U.S. Provisional Application Ser. No. 62/621,801, entitled "PUNCTURING PT-RS BASED on a collision between PT-RS and CORESET" and filed on Jan. 25, 2018, which is expressly incorporated by reference herein in its entirety.

BACKGROUND

Technical Field

The present disclosure relates generally to communication systems, and more particularly, to wireless communication including a Control Resource Set (CORESET) and a Phase Tracking Reference Signal (PT-RS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

CORESET is a set of resources that are configured by higher layer signaling to potentially transmit control signaling, e.g., a Physical Downlink Control Channel (PDCCH). Even though resources are configured for CORESET, a portion of the CORESET resources might not be scheduled for PDCCH and may instead be used to transmit a physical downlink shared channel (PDSCH). PT-RS is transmitted by a transmitter and used by a receiver to track phase and frequency error in time. On the downlink, the PT-RS may be present in the Resource Blocks (RBs) scheduled for PDSCH to enable the receiving UE to correct phase error and reduce decoding errors for the PDSCH. At times, PT-RS resources may collide with CORESET resources. Similar collisions may occur in the uplink between PT-RS and control transmissions. The PT-RS may be punctured, e.g., not transmitted, when the Resource Element (RE) of the PT-RS is also configured for a CORESET. Such puncturing ensures that REs are maintained for control signals and are not used for inserting PT-RS.

Not all of the resources in the CORESET may be used to transmit PDCCH. Instead, some resources may be used to transmit PDSCH. Thus, the PT-RS may collide with CORESET resources that are scheduled for PDSCH rather than PDCCH. Puncturing the PT-RS for such PDSCH that is scheduled in the CORESET may lead to lower decoding rates at receivers.

The present application provides a solution to this problem that continues to avoid the use of control resources for PT-RS while avoiding unnecessary reduction in PT-RS and degradation in phase tracking. When PT-RS for a receiver collides with the CORESET for the receiver, the transmitter may puncture the PT-RS only in RBs colliding with control transmissions (e.g., PDCCH) rather than puncturing the PT-RS over the entire CORESET. Thus, the transmitter may refrain from puncturing the PT-RS in CORESET RBs that are scheduled for data and/or that are used to transmit data (e.g., PDSCH).

In an aspect of the disclosure, a method, a computer-readable medium, and an apparatus are provided for wireless communication at a transmitter, e.g., at a base station such as a gNB. The apparatus identifies a potential collision between a first set of resources configured for a CORESET for a receiver and a second set of resources configured for a PT-RS for the receiver. The apparatus punctures the PT-RS based on whether the colliding resources in the first set of resources configured for the CORESET are configured/used for a control transmission (e.g., PDCCH). For example, the apparatus may puncture the PT-RS only for resource blocks of the CORESET colliding with the control transmission without puncturing the PT-RS over an entire set of the colliding resources configured for the CORESET.

In an aspect of the disclosure, a method, a computer-readable medium, and an apparatus are provided for wireless communication at a receiver, e.g., at a user equipment (UE). The apparatus identifies a potential collision between a first set of resources configured for a CORESET for the receiver and a second set of resources configured for a PT-RS for the receiver. The UE determines whether the PT-RS will be punctured based on whether the colliding resources in the first set of resources configured for the CORESET are configured/used for a control transmission (e.g., PDCCH). Then, the UE receives the PT-RS based on the identified set of resources configured for PT-RS and a determination regarding whether the PT-RS will be punctured.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
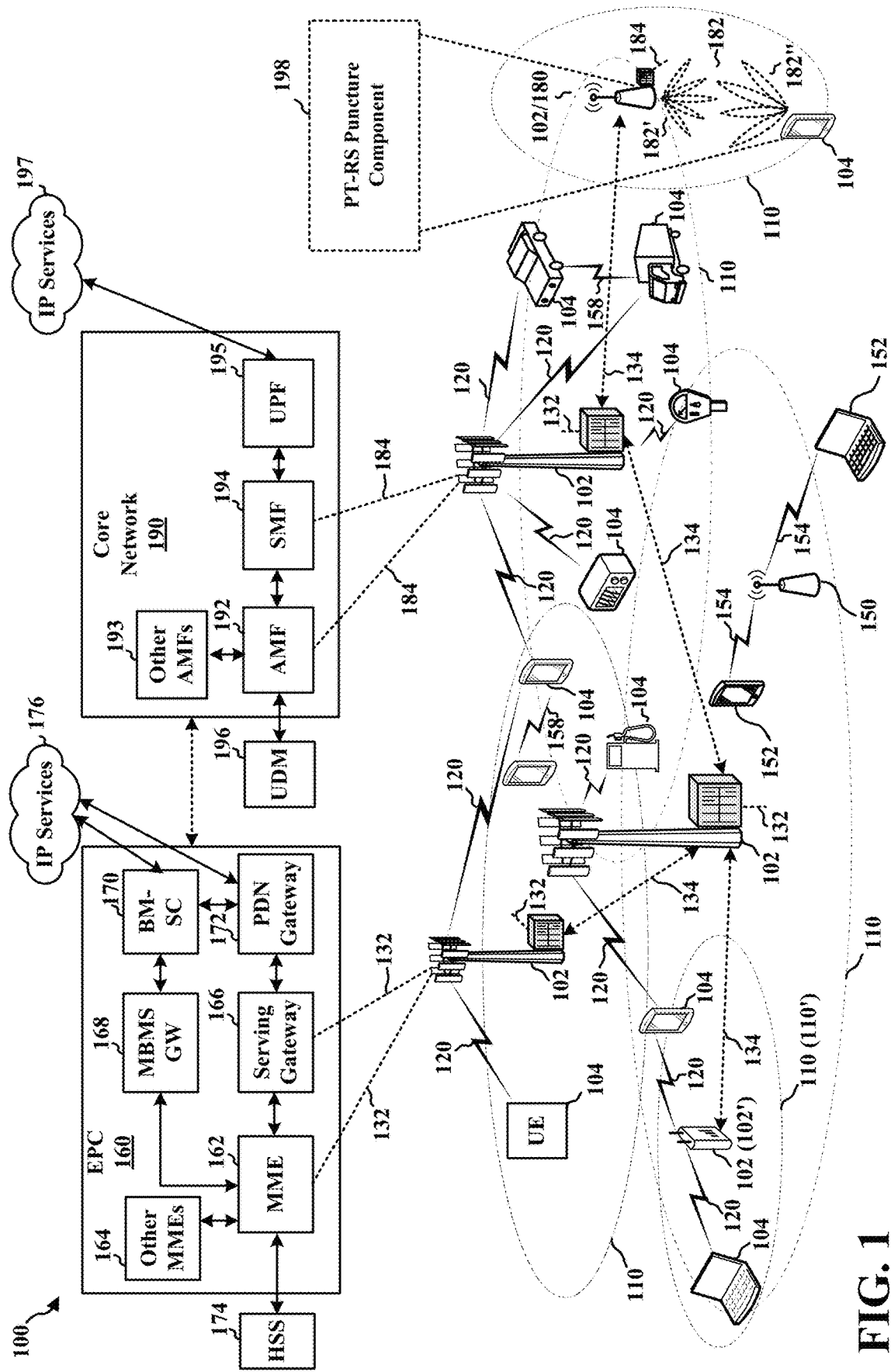
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or base station 180 may be configured to include a PT-RS puncture component (198). In a transmitter, the puncture component 198 may puncture a PT-RS based on the determination of whether the colliding resources in the first set of resources are configured for a control transmission or the data transmission, e.g., as described in connection with FIGS. 5-15.

In a UE 104, the puncture component 198 may determine whether the PT-RS from base station 180 will be punctured based on the determination of whether the colliding resources in the first set of resources are configured for the control transmission (e.g., PDCCH) or the data transmission (e.g., PDSCH), as described in connection with FIGS. 5-15.

Figure 2:
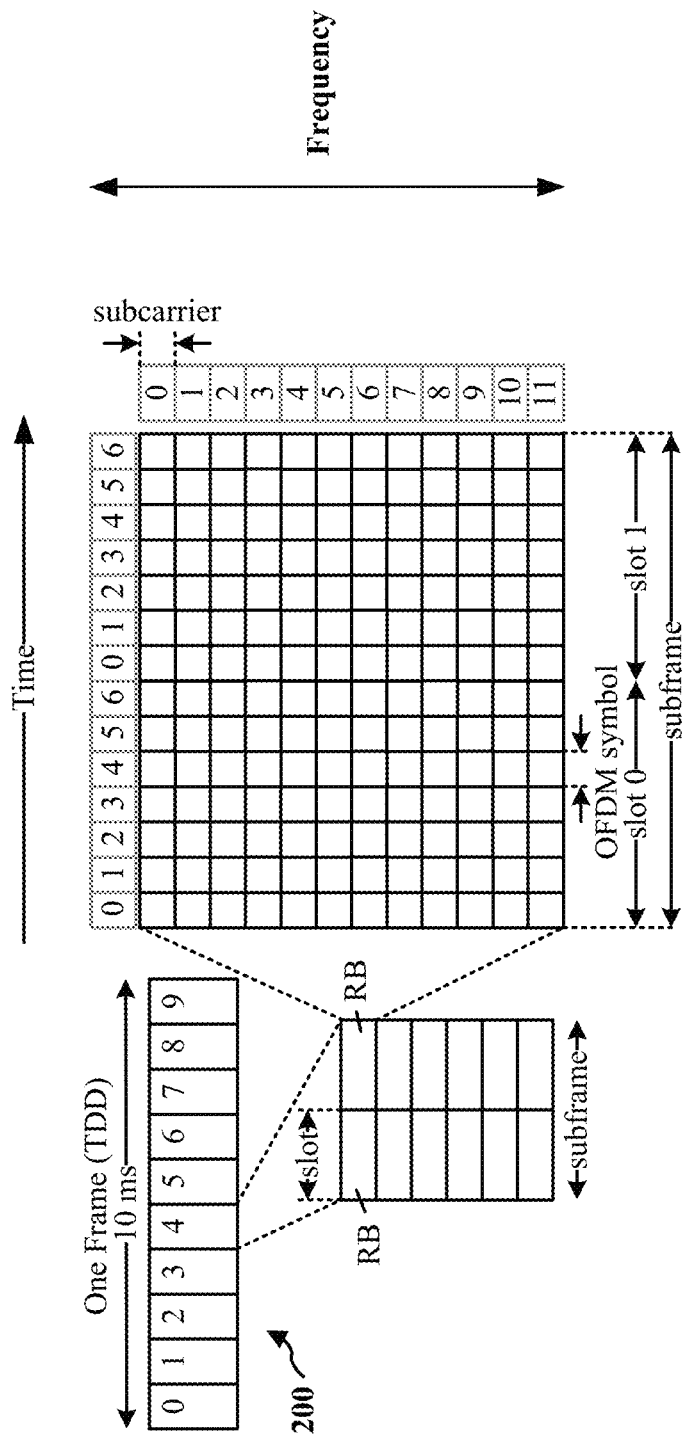
FIG. 2 illustrates an example frame structure.

FIG. 2 is a diagram 200 illustrating an example frame structure, e.g., that may be used within a 5G/NR frame structure. The frame structure may define resources in time and frequency for wireless communication. The frame structure may be for uplink or downlink subframes. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the example illustrated in FIG. 2, the frame structure is TDD, with DL subframes and/or UL subframes. Any particular subframe may be split into different subsets that provide both UL and DL. Note that the description infra applies also to a 5G/NR frame structure that is FDD.

Other wireless communication technologies may have a different frame structure and/or different channels. A frame (e.g., 10 ms) may be divided into equally sized subframes, such as 10 equally sized subframes (1 ms). Each subframe may include one or more time slots. Each slot may include a defined number of symbols, e.g., 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration may be a function of the numerology. The subcarrier spacing may be equal to $2^\mu * 15$ kKz, where $\mu$ is the numerology 0-5. The symbol length/duration is inversely related to the subcarrier spacing. One example of subcarrier spacing is 15 kHz, and one example of symbol duration is approximately 66.7 μs.

A resource grid may be used to represent the frame structure. Each time slot may include a resource block (RB) (also referred to as physical RBs (PRBs)) that extends for a certain number of consecutive subcarriers. In FIG. 2, 12 consecutive subcarriers are illustrated. The resource grid may be divided into multiple resource elements (REs). The number of bits carried by each RE may depend on the modulation scheme.

Some of the REs may carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

Various channels may be comprised within a DL subframe of a frame. Examples of possible channels may include a physical control format indicator channel (PCFICH) that carries a control format indicator (CFI) that indicates which symbols the physical downlink control channel (PDCCH) occupies, a PDCCH carrying downlink control information (DCI) within one or more control channel elements (CCEs), each CCE including nine RE groups (REGs), each REG including four consecutive REs in an OFDM symbol, a UE-specific enhanced PDCCH (ePDCCH) that also carries DCI, a physical hybrid automatic repeat request (ARQ) (HARQ) indicator channel (PHICH) that carries the HARQ indicator (HI) that indicates HARQ acknowledgement (ACK)/negative ACK (NACK) feedback based on the physical uplink shared channel (PUSCH), and a primary synchronization channel (PSCH). The PSCH may carry a primary synchronization signal (PSS) that is used by a UE 104 to determine subframe/symbol timing and a physical layer identity. A secondary synchronization channel (SSCH) be included in the frame, e.g., carrying a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. A physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). A physical downlink shared channel (PDSCH) may carry user data, broadcast system information not transmitted through the PBCH such as system information blocks (SIBs), and paging messages.

Some of the REs may carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

Example uplink channels include a physical random access channel (PRACH) that allows the UE to perform initial system access and achieve UL synchronization, and a physical uplink control channel (PUCCH) that carriers uplink control information (UCI), such as scheduling requests, a channel quality indicator (CQI), a precoding matrix indicator (PMI), a rank indicator (RI), and HARQ ACK/NACK feedback. The PUSCH may carry data, and may additionally be used to carry a buffer status report (BSR), a power headroom report (PHR), and/or UCI.

Figure 3:
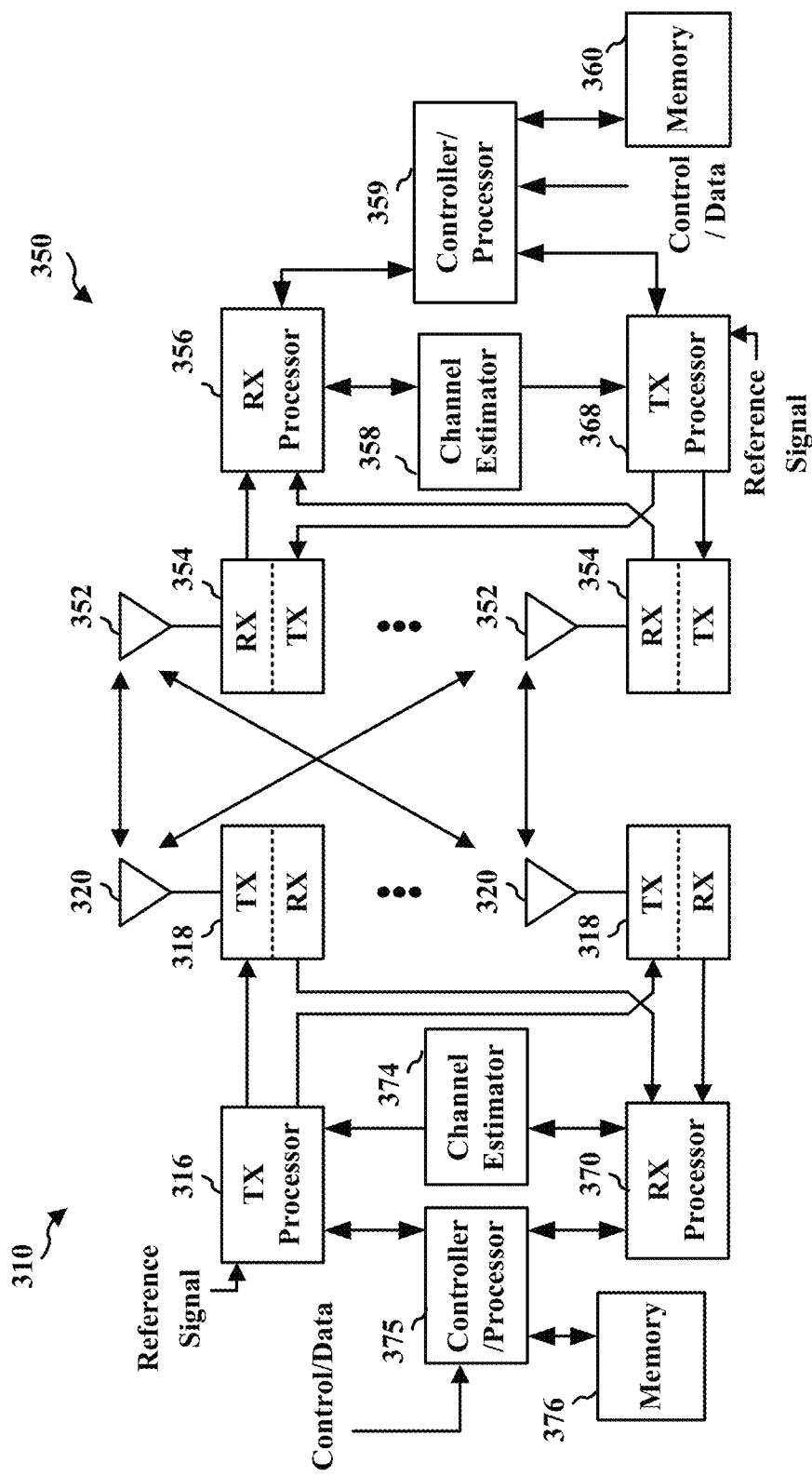
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
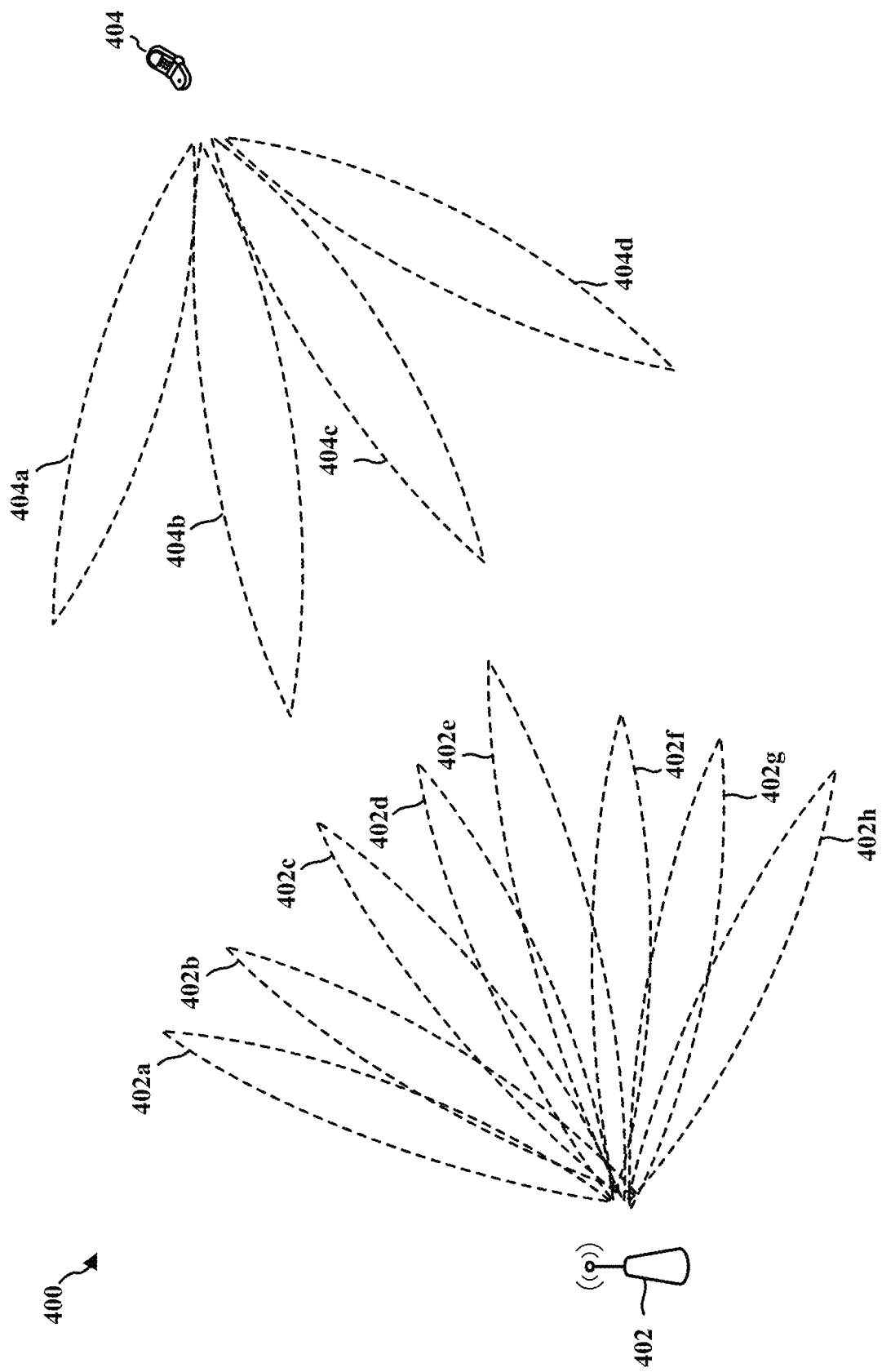
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5:
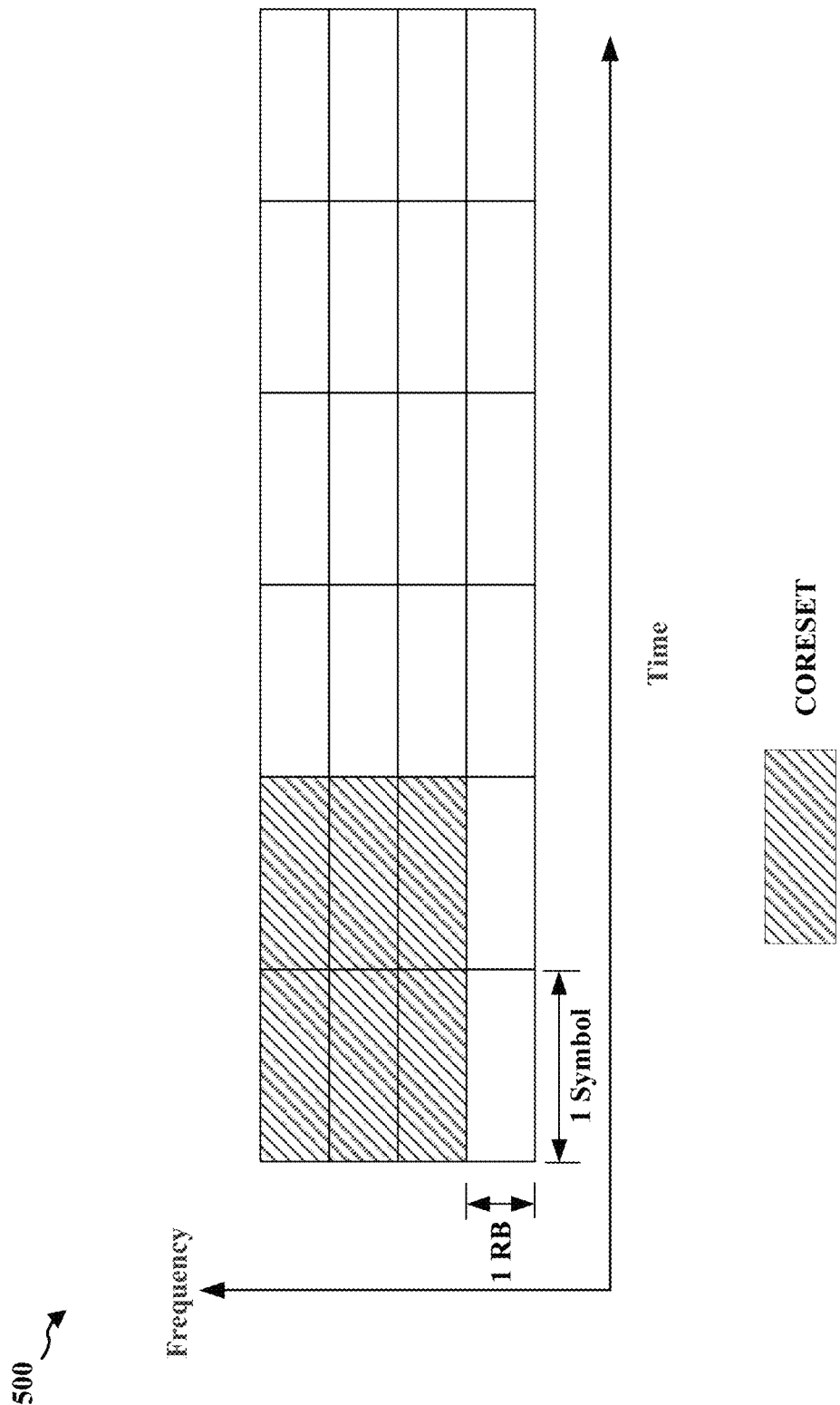
FIG. 5 illustrates a diagram of resources comprising CORESET.

CORESET is a set of resources that are configured by higher layer signaling to potentially transmit control signaling, e.g., PDCCH. The CORESET may comprise multiple RBs and may extend across multiple symbols. FIG. 5 illustrates an example diagram of resources 500 in which the CORESET extends across three RBs in a first symbol and the same three RBs in a second symbol. The frequency range and length are merely examples. The CORESET may include various combinations of RBs and symbols. A UE may be configured with multiple CORESETs. Even though resources are configured for CORESET, a portion of the CORESET resources might not be scheduled for PDCCH for the UE. Even if scheduled for PDCCH, a portion of the resources might not be used for PDCCH. For example, some of the CORESET RBs might not be needed to transmit PDCCH to the UE. These remaining resources may be used by the base station to transmit data, e.g., PDSCH, to the UE.

Figure 6A:
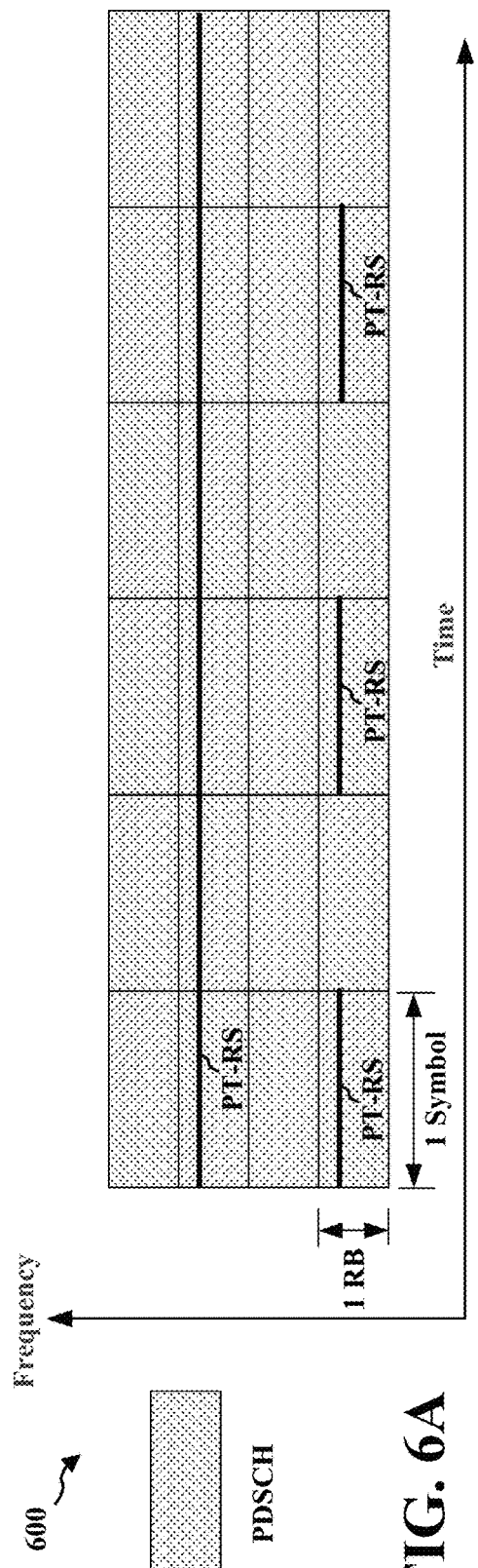
FIG. 6A and FIG. 6B illustrate diagrams of resources comprising PT-RS.
Figure 6B:
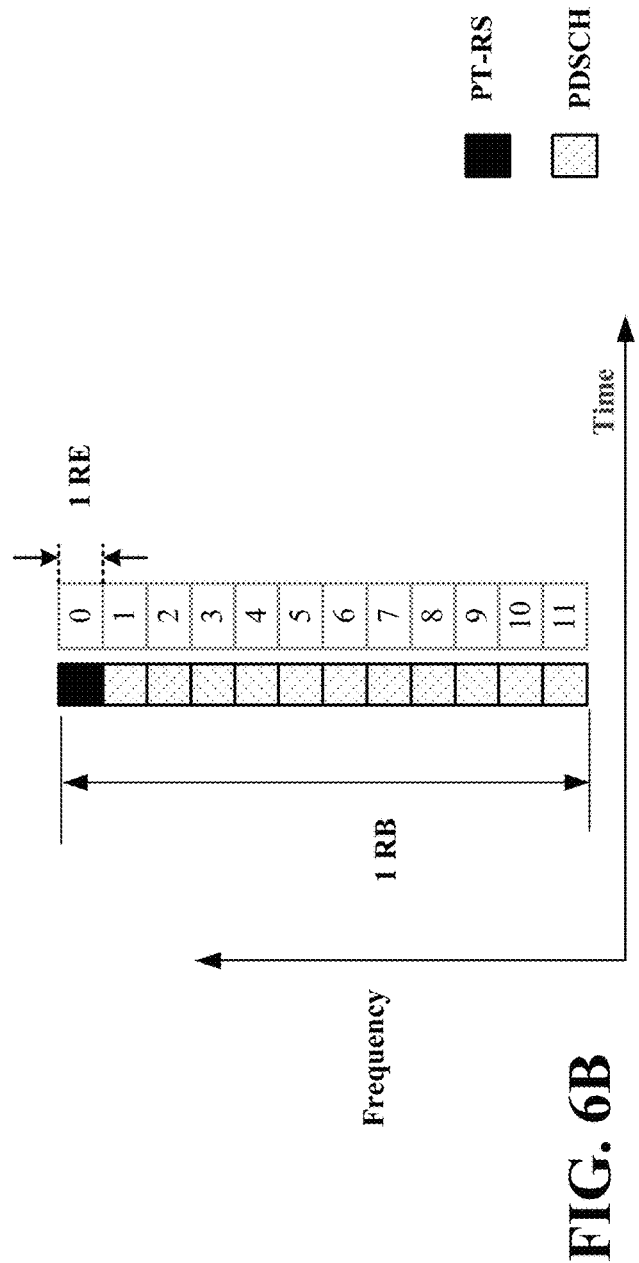

PT-RS is transmitted by a transmitter along with data. The PT-RS is used by a receiver to track phase and frequency error in time. On the downlink, the PT-RS may be present in the RBs scheduled for PDSCH to enable the receiving UE to correct phase error and reduce decoding errors for the PDSCH. FIG. 6A illustrates an example diagram of resources 600 over which PDSCH is transmitted by a base station. FIG. 6A illustrates PT-RS transmitted in the same RBs as the PDSCH. PT-RS may be distributed across the scheduled PDSCH RBs in the frequency domain, e.g., the PT-RS may be transmitted at multiple frequencies across the scheduled PDSCH RBs. FIG. 6A illustrates the two PT-RS transmitted at two different frequencies two respective RBs. The PT-RS may occupy a single resource element (RE) within an RB. For example, FIG. 6B illustrates that an RB may include 12 REs, with only a single RE occupied by the PT-RS. The remaining REs may be occupied by PDSCH. The PT-RS may occupy one RE in each RB, one RE in every two RBs, one RE in every 4 RBs, etc. FIG. 6A illustrates the PT-RS occupying an RE in every two RBs. In the time domain, the PT-RS may be continuous or discontinuous in the PDSCH symbols. FIG. 6A illustrates one PT-RS that is continuous in time over the PDSCH symbols and another PT-RS that is discontinuous in time. While FIG. 6A illustrates the discontinuous PT-RS being transmitted every other symbol, the PT-RS may be transmitted every third symbol, every fourth symbol, etc.

Figure 7:
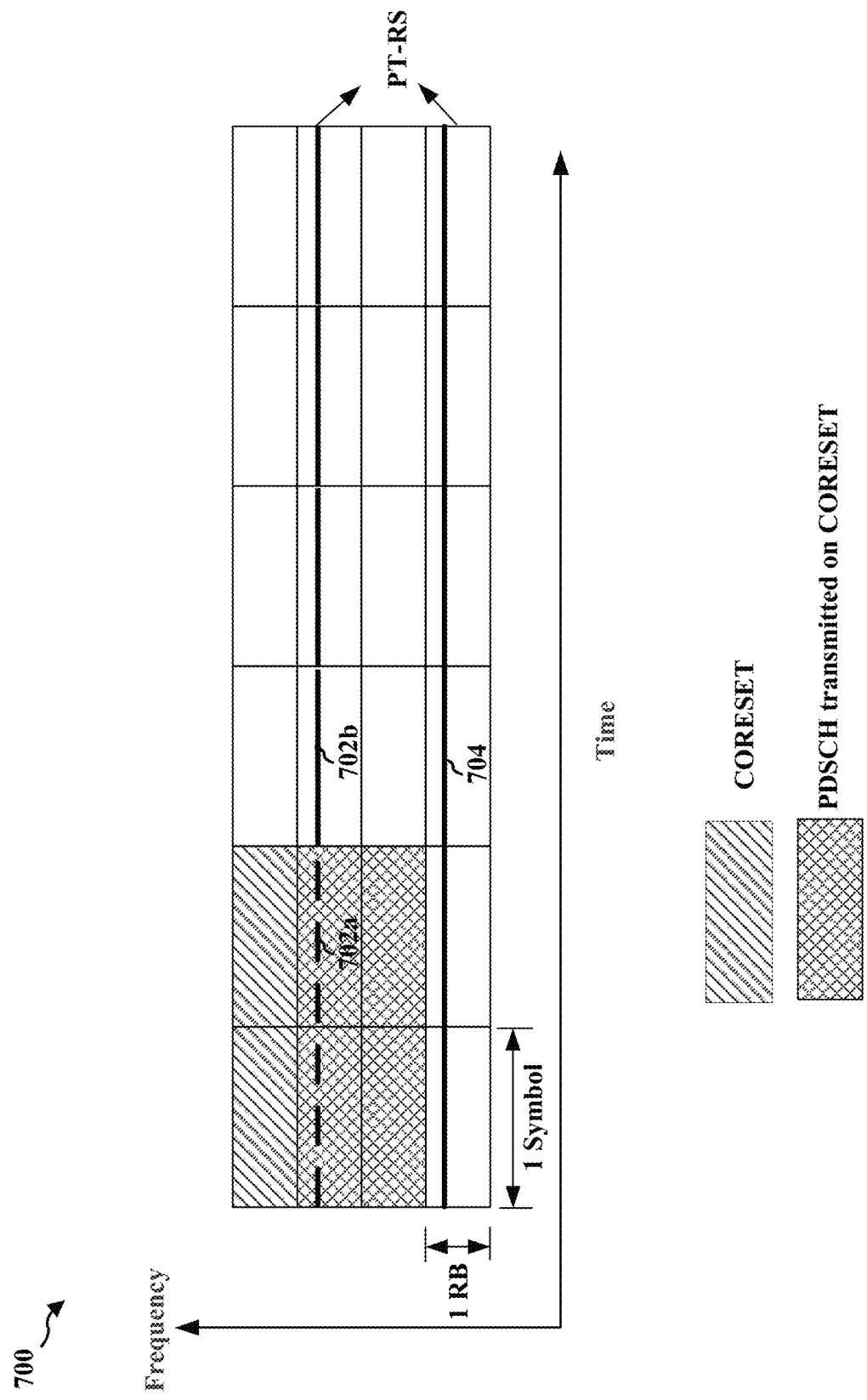
FIG. 7 illustrates a diagram of resources comprising CORESET colliding with PT-RS.

At times, PT-RS resources may collide in time and frequency with CORESET resources. FIG. 7 illustrates a resource diagram 700 having two PT-RS configured across multiple symbols. PT-RS 704 does not collide with the CORESET. The other PT-RS has a portion 702a that collides with the CORESET and a portion 702b that does not collide with the CORESET. The PT-RS may be punctured when the RE of the PT-RS is also configured for a CORESET. When a resource element is scheduled with more than one channel or signal, e.g., PT-RS and CORESET, the transmitter may be limited to transmitting one channel or one signal. Thus, the other signal or channel is punctured, meaning that the other channel is not transmitted in the resource element. Thus, portion 702a of the PT-RS is illustrated as a dashed line to illustrate that the transmission of the PT-RS is punctured. Such puncturing ensures that CORESET REs are maintained for control signals and are not used for inserting PT-RS. all of the resources Not in the CORESET may be used to transmit PDCCH. Some resources may be used to transmit PDSCH. Thus, as illustrated in FIG. 7, the PT-RS may collide with CORESET resources that are not scheduled for PDCCH, but that are instead scheduled for PDSCH. Puncturing the PT-RS for the PDSCH because the PDSCH is scheduled in the CORESET may lead to lower decoding rates at receivers. For example, multiple PT-RS REs may be needed within a single symbol to achieve sufficient processing gain to provide robustness to thermal noise and frequency selective fading in phase tracking. Thus, the phase tracking performance may suffer due to the punctured PT-RS. Puncturing all PT-RS colliding with the resources of the CORESET configuration may, at times, lead to a reduction in PT-RS REs and may negatively affect phase tracking at a receiver that relies on the PT-RS.

The present application provides a solution to this problem that continues to avoid the use of control resources for PT-RS while avoiding unnecessary reduction in PT-RS and degradation in phase tracking. When PT-RS collides with the CORESET, the transmitter may puncture the PT-RS for a UE only in RBs colliding with control transmissions (e.g., detected PDCCH for a UE) rather than puncturing the PT-RS over the entire CORESET for the UE. Thus, the transmitter may refrain from puncturing the PT-RS in CORESET RBs that are scheduled for data and/or that are used to transmit data (e.g., PDSCH) rather than for transmitting PDCCH.

Figure 8:
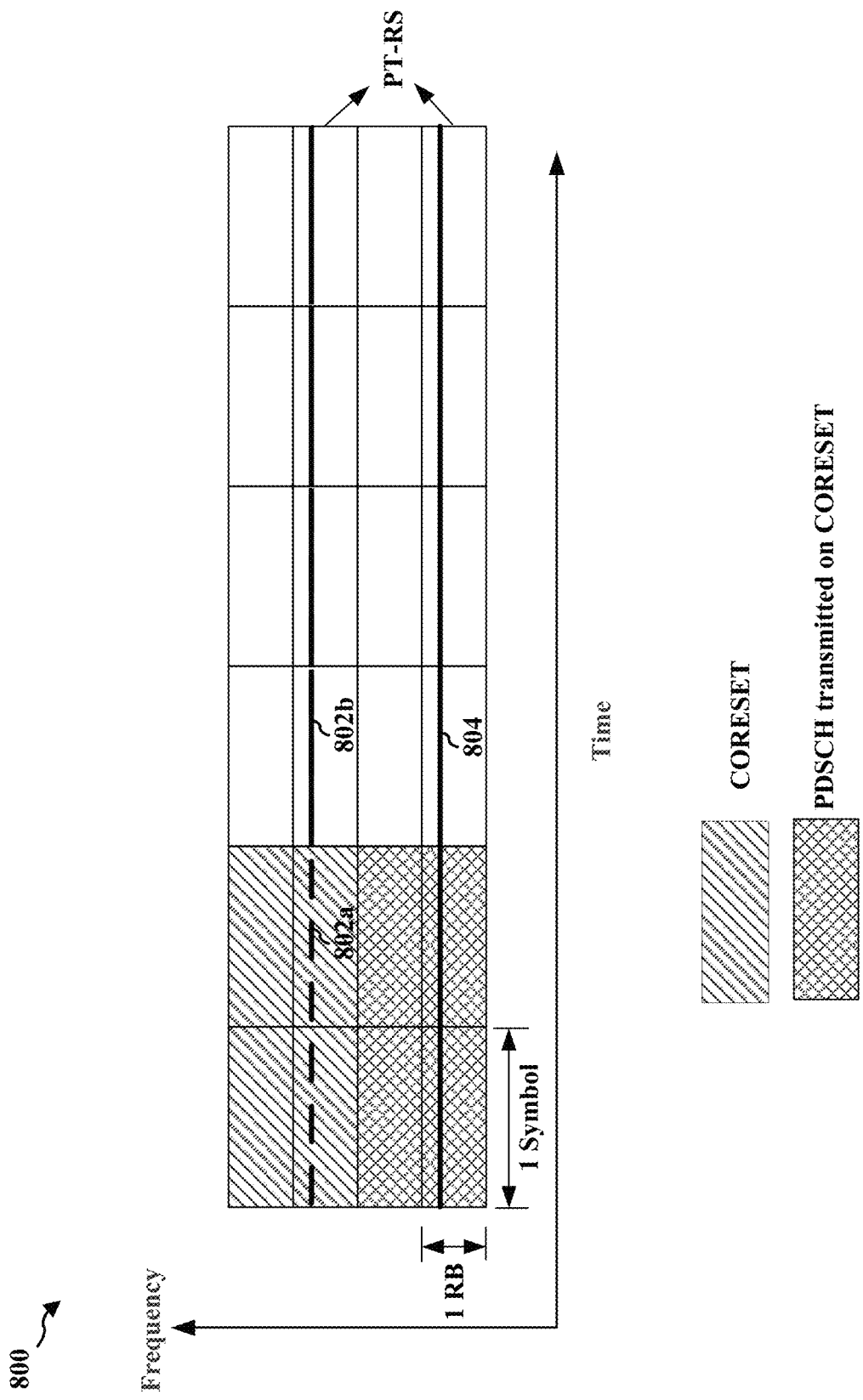
FIG. 8 illustrates a diagram of resources comprising CORESET colliding with PT-RS.

FIG. 8 illustrates an example diagram 800 having two PT-RS configured for a UE continuously across multiple symbols in two different RBs. Both PT-RS collide with CORESET resources for the UE. However, PT-RS 804 collides with CORESET resources that are used to transmit data, e.g., PDSCH. These resources may be configured for CORESET, but may be scheduled for PDSCH rather than PDCCH. As an alternative, the resources may be CORESET resources that are scheduled for PDCCH, but which are actually used to transmit PDSCH. The transmitter may refrain from puncturing PT-RS 804 in the CORESET resources, because the CORESET resources are scheduled to/used to transmit data rather than control signaling. In contrast, a portion 802a of the other PT-RS collides with CORESET resources used to transmit PDCCH. In this example, the colliding PT-RS may be punctured so that PT-RS is not transmitted on the portion 802a and is only transmitted on portion 802b.

Figure 9:
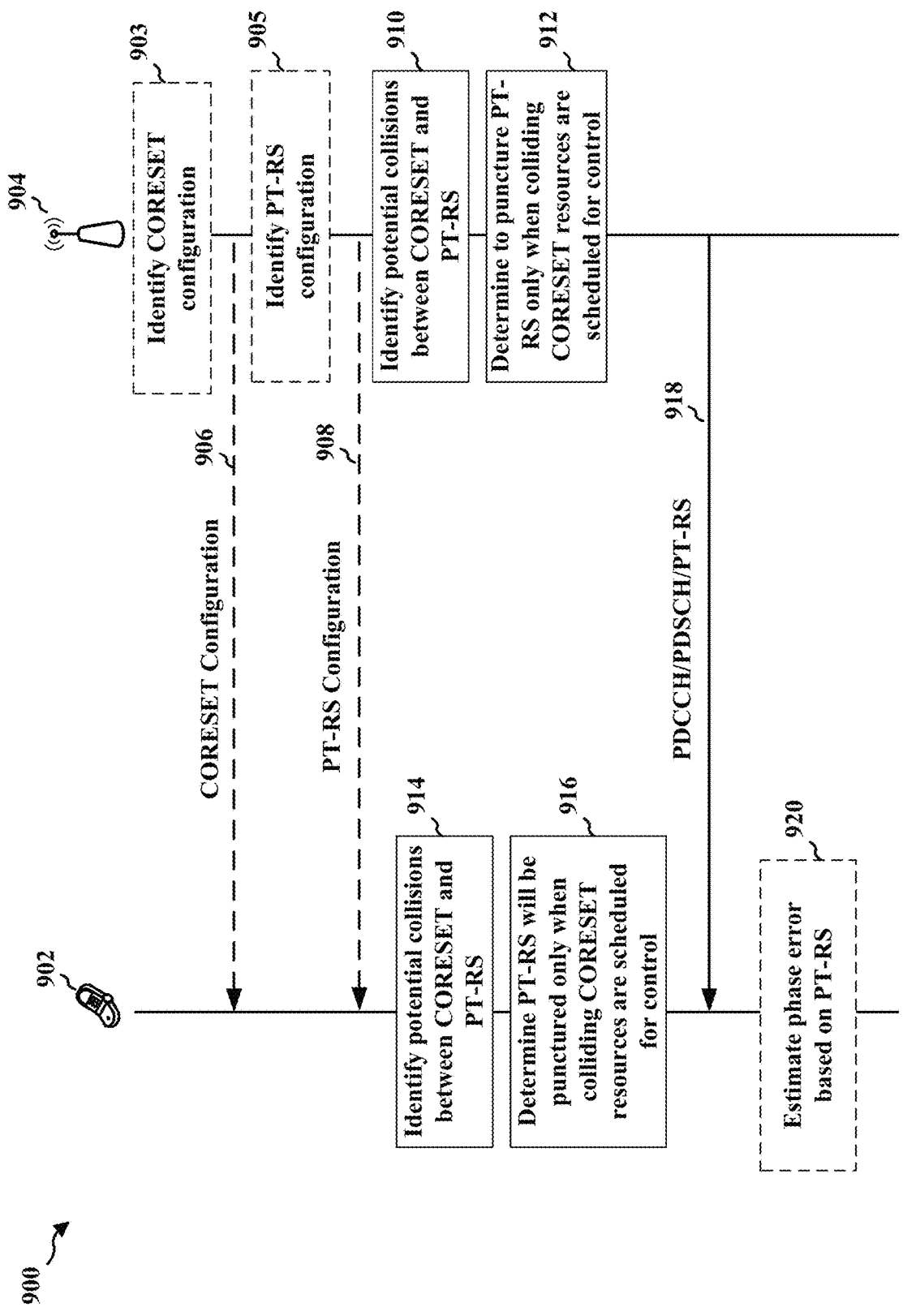
FIG. 9 illustrates an example of a communication flow between a base station and a UE.

FIG. 9 illustrates a communication flow 900 between a transmitter and a receiver. In this example, the transmitter is a base station 904 (e.g., base station 102, 180, 310, 402, 1450, the apparatus 1102, 1102') and the receiver is a UE 902 (e.g., UE 104, 350, 404, 1150, the apparatus 1402, 1402').

The transmitter may identify a CORESET configuration for the receiver 902, at 903. The CORESET configuration may identify the location of CORESET resources configured by higher layer signaling for the potential transmission of a control channel (e.g., PDCCH). As CORESET resources not used for control transmissions may be used to transmit data, the CORESET configuration for the receiver 902 that is identified at 903 may indicate which CORESET resources are scheduled for PDCCH for the receiver 902 and which are scheduled for PDSCH for the receiver 902. For example, the receiver's CORESET configuration may indicate a location of a set of CORESET RBs along with an indication of a subset of the CORESET RBs that are scheduled for PDCCH for the receiver 902 and/or a subset of the CORESET RBs that are scheduled for PDSCH for the receiver 902. The CORESET configuration may be transmitted to the receiver 902 at 906.

The transmitter may identify a PT-RS configuration for the receiver 902, at 905. The receiver's PT-RS configuration may indicate a location of the PT-RS in frequency (e.g., RE(s) on which the PT-RS is configured) and in time (e.g., including whether the PT-RS is continuous or discontinuous in time). The PT-RS configuration may also be provided to the receiver 902, at 908.

At 910, the transmitter may identify a potential collision between resource configured for PT-RS for the receiver and resources configured for the CORESET for the receiver. The identification of the potential collision may be based, e.g., on the CORESET configuration identified at 903 and the PT-RS configuration identified at 905.

Rather than puncturing PT-RS for the receiver that collides with any CORESET resources for the receiver, the transmitter may determine at 912 to puncture the PT-RS only when the PT-RS resources for the receiver collide with CORESET resources that are scheduled for control transmissions for the receiver, e.g., PDCCH that carries information scheduling PDSCH. Thus, rather than puncturing the PT-RS over the entire CORESET, the transmitter may refrain from puncturing PT-RS colliding with CORESET resources scheduled for data transmission (e.g., PDSCH).

The transmitter may then transmit PDCCH, PDSCH, and PT-RS based on the puncturing determined at 912, e.g., as in the example of FIG. 8.

Similar to the transmitter, the receiver may identify potential collisions between the CORESET and PT-RS at 914. This identification may be based on the CORESET configuration and the PT-RS configuration. The receiver may then determine whether PT-RS will be punctured due to the identified collision at 916. The receiver may identify portions of the PT-RS that will be punctured based on whether the CORESET is scheduled for PDCCH or PDSCH. Similar to 912, the receiver may determine that the PT-RS will be punctured only when the PT-RS resources collide with CORESET scheduled for PDCCH.

The UE may use the determination at 916 in receiving the PDCCH, PDSCH, and/or PT-RS from the transmitter. By determining which PT-RS resources will be punctured, the receiver can use the information to more accurately estimate phase error at 924 based on the received PT-RS.

Figure 10:
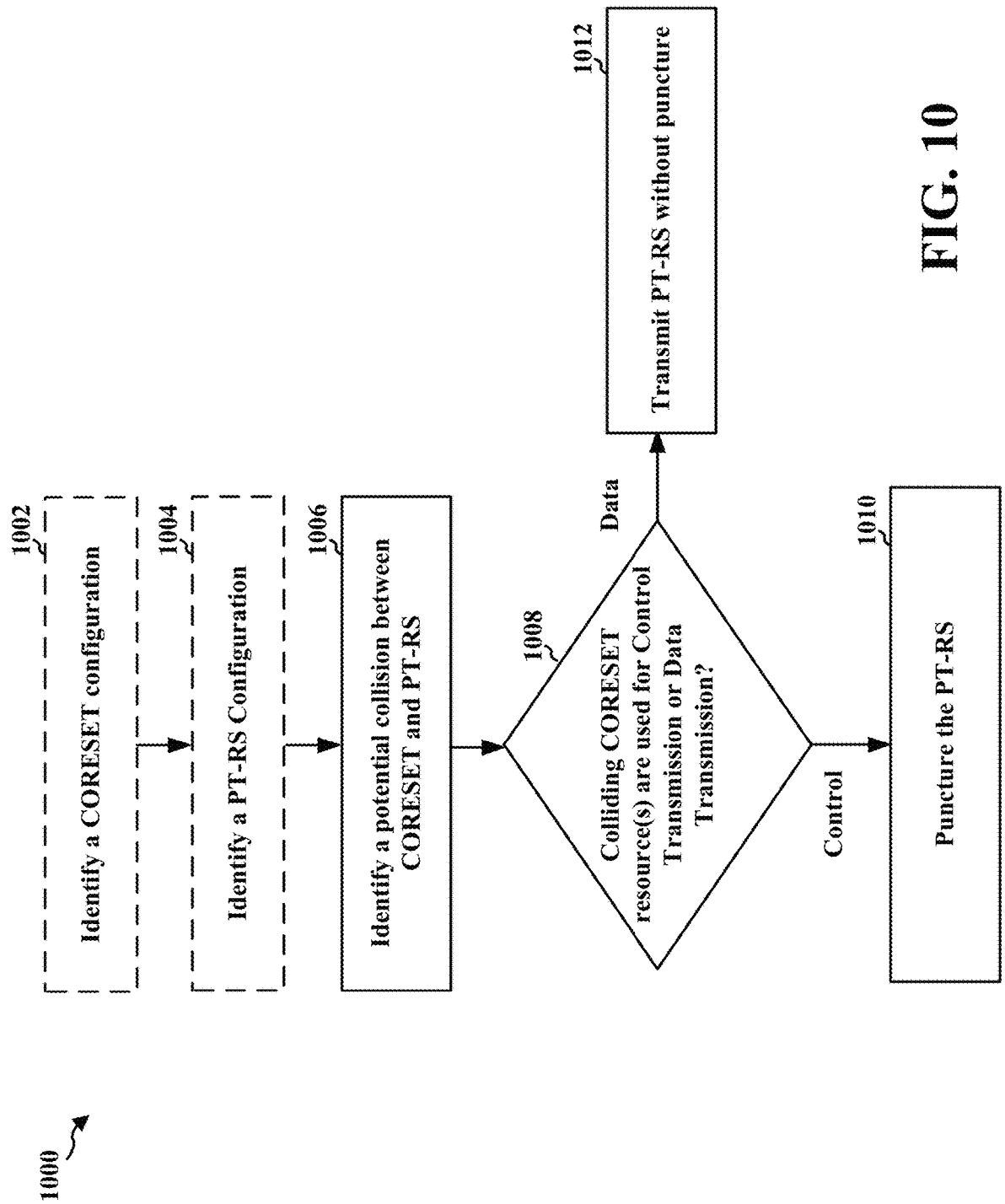
FIG. 10 is a flowchart of a method of wireless communication.

FIG. 10 is a flowchart 1000 of a method of wireless communication. The method may be performed by a transmitter, such as a base station (e.g., base station 102, 180, 310, 402, 904, 1450, the apparatus 1102, 1102') in wireless communication with a receiver, such as a UE (e.g., UE 104, 350, 404, 902, 1150, the apparatus 1402, 1402'). The communication may comprise, e.g., 5G/NR wireless communication. Aspects of the method help to use resources for control in an efficient manner while avoiding unnecessary reduction in PT-RS and degradation in phase tracking.

At 1006, the transmitter identifies a potential collision between a first set of resources configured for a CORESET for the receiver and a second set of resources configured for a PT-RS for the receiver. FIGS. 7 and 8 illustrate examples of potential collisions between PT-RS and CORESET. The transmitter may identify a CORESET configuration at 1002 and may identify a PT-RS configuration at 1004. The CORESET configuration may indicate a location of the first set of resources configured for the CORESET and whether individual resources within the first set of resources are scheduled for the control transmission (e.g., PDCCH scheduling PDSCH) or the data transmission (PDSCH). The potential collision may be identified based on the CORESET configuration and the PT-RS configuration.

At 1008, the transmitter may determine whether colliding resources in the first set of resources configured for the CORESET for the receiver are configured for a control transmission (e.g., PDCCH) or a data transmission (e.g., PDSCH).

Then, the transmitter may puncture the PT-RS for the receiver, at 1012, based on the determination of whether the colliding resources in the first set of resources are configured for the control transmission or the data transmission. The transmitter punctures the PT-RS, at 1012, when the colliding resources in the first set of resources configured for the CORESET are configured/used for the control transmission. The transmitter transmits the PT-RS without puncturing, at 1010, when the colliding resources configured for the CORESET are configured/used for the data transmission. Thus, the transmitter punctures the PT-RS only for RBs of the CORESET colliding with the control transmission without puncturing the PT-RS over an entire set of the colliding resources configured for the CORESET, e.g., as illustrated in the example of FIG. 8.

Figure 11:
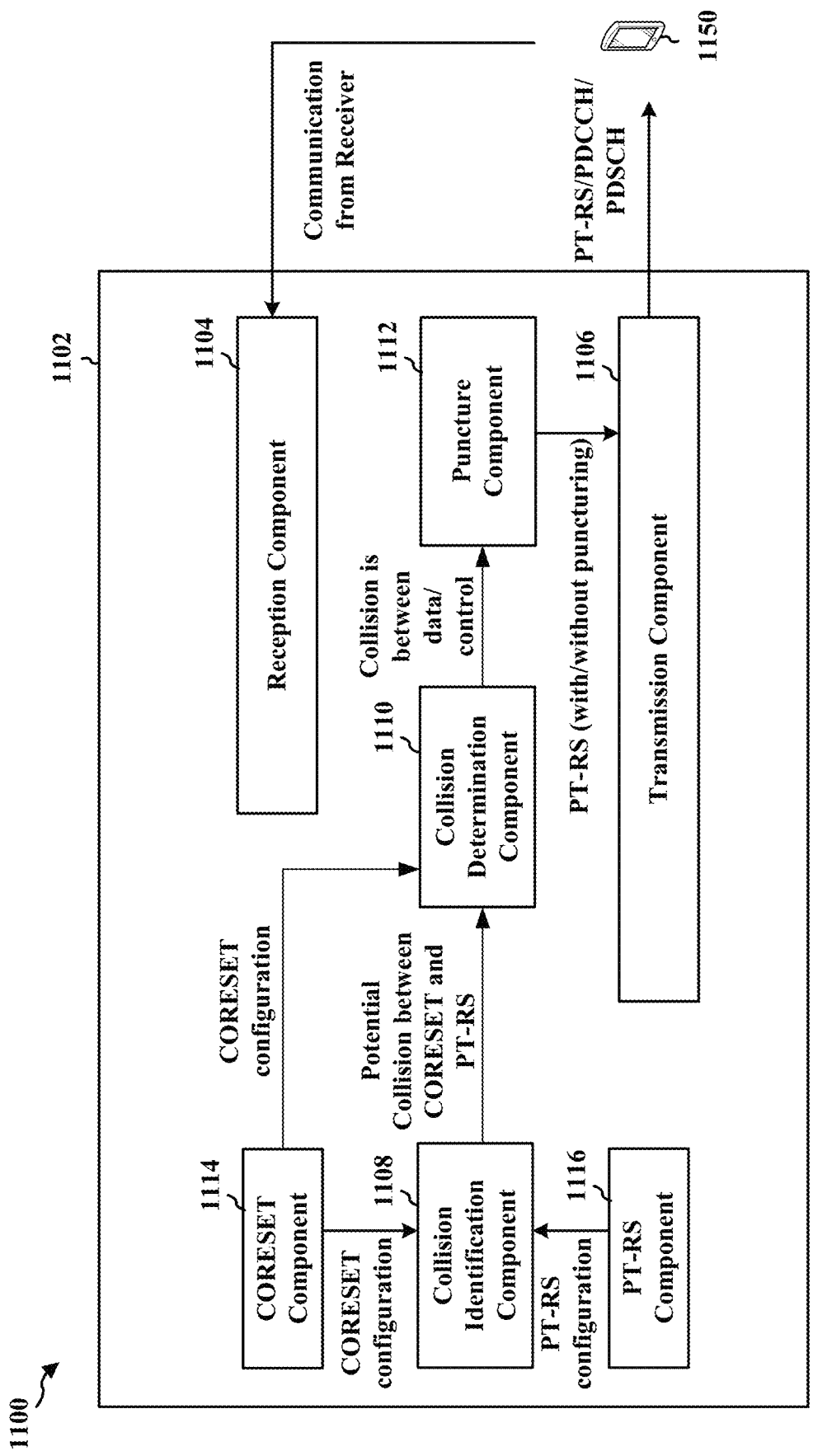
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a transmitter, such as a base station (e.g., base station 102, 180, 310, 402, 904, 1450) in wireless communication with a receiver, such as a UE (e.g., UE 104, 350, 404, 902, 1150, the apparatus 1402, 1402'). The apparatus includes a reception component 1104 that receive communication from the receiver, e.g., uplink communication from a UE. The apparatus includes a transmitter component 1106 that transmits communication to the receiver, e.g., including downlink communication such as PDCCH, PDSCH, and PT-RS, as described in connection with FIGS. 9 and 10.

The apparatus may include a collision identification component 1108 configured to a potential collision between a first set of resources configured for a CORESET and a second set of resources configured for a PT-RS, and a collision determination component 1110 configured to determine whether colliding resources in the first set of resources configured for the CORESET are configured for a control transmission or a data transmission. The apparatus may also include a puncture component 1112 configured to puncture the PT-RS based on the determination of whether the colliding resources in the first set of resources are configured for the control transmission or the data transmission. Thus, the transmission component 1106 may transmit the PT-RS with/without puncturing based on the puncturing determined by the puncture component 1112. The transmission component may transmit the PT-RS along with PDCCH and/or PDSCH. The apparatus may further include a CORESET component 1114 configured to identify a CORESET configuration and a PT-RS component 1116 configured to identify a PT-RS configuration.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
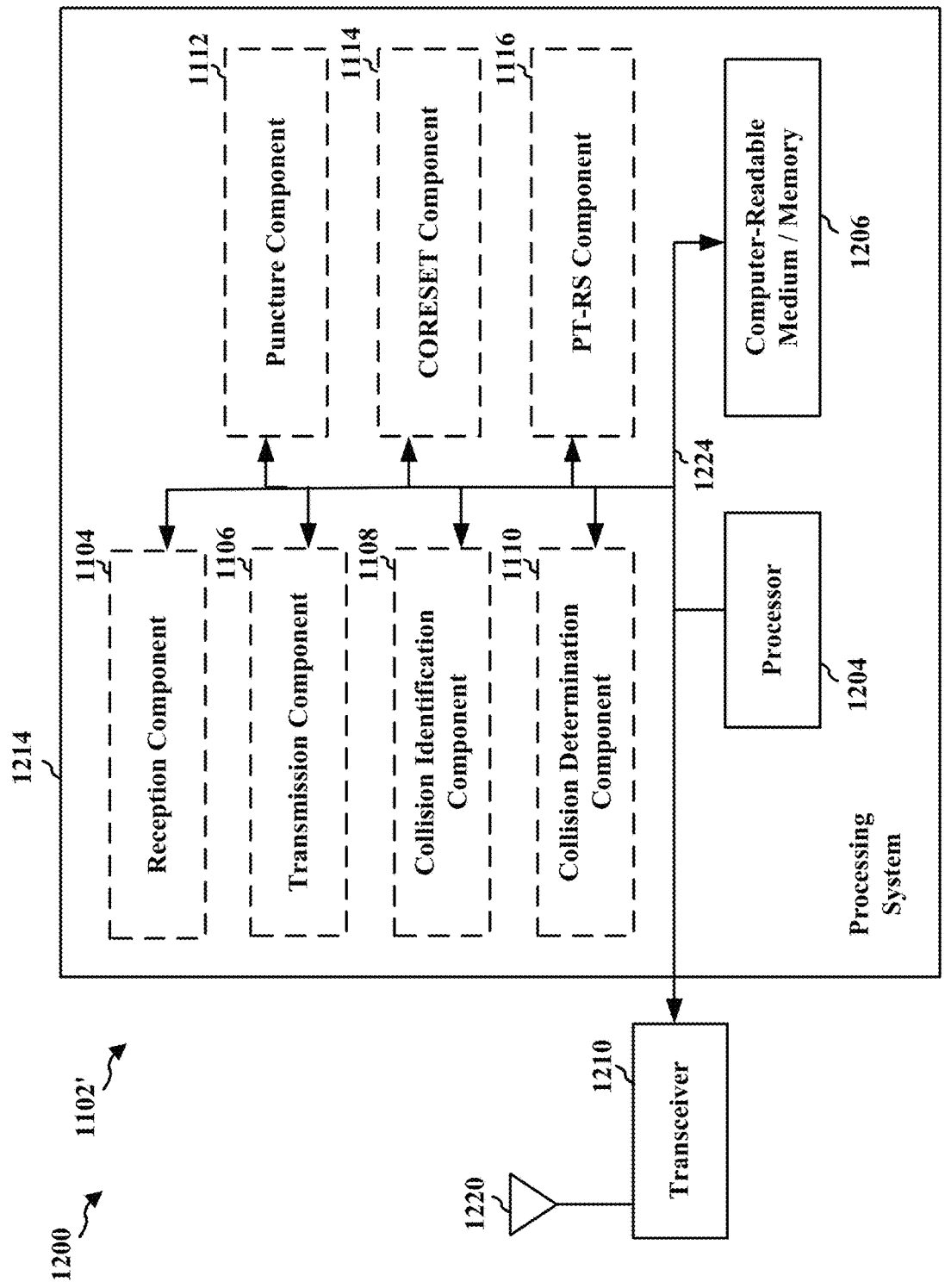
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. In one configuration, the apparatus 1102/1102' for wireless communication includes means for identifying a potential collision between a first set of resources configured for a CORESET and a second set of resources configured for a PT-RS (e.g., 1108), means for determining whether colliding resources in the first set of resources configured for the CORESET are configured for a control transmission or a data transmission (e.g., 1110), means for puncturing the PT-RS based on the determination of whether the colliding resources in the first set of resources are configured for the control transmission or the data transmission (e.g., 1112), means for transmitting the PT-RS (e.g., 1106), means for identifying a CORESET configuration (e.g., 1114), and means for identifying a PT-RS configuration (e.g., 1116). The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
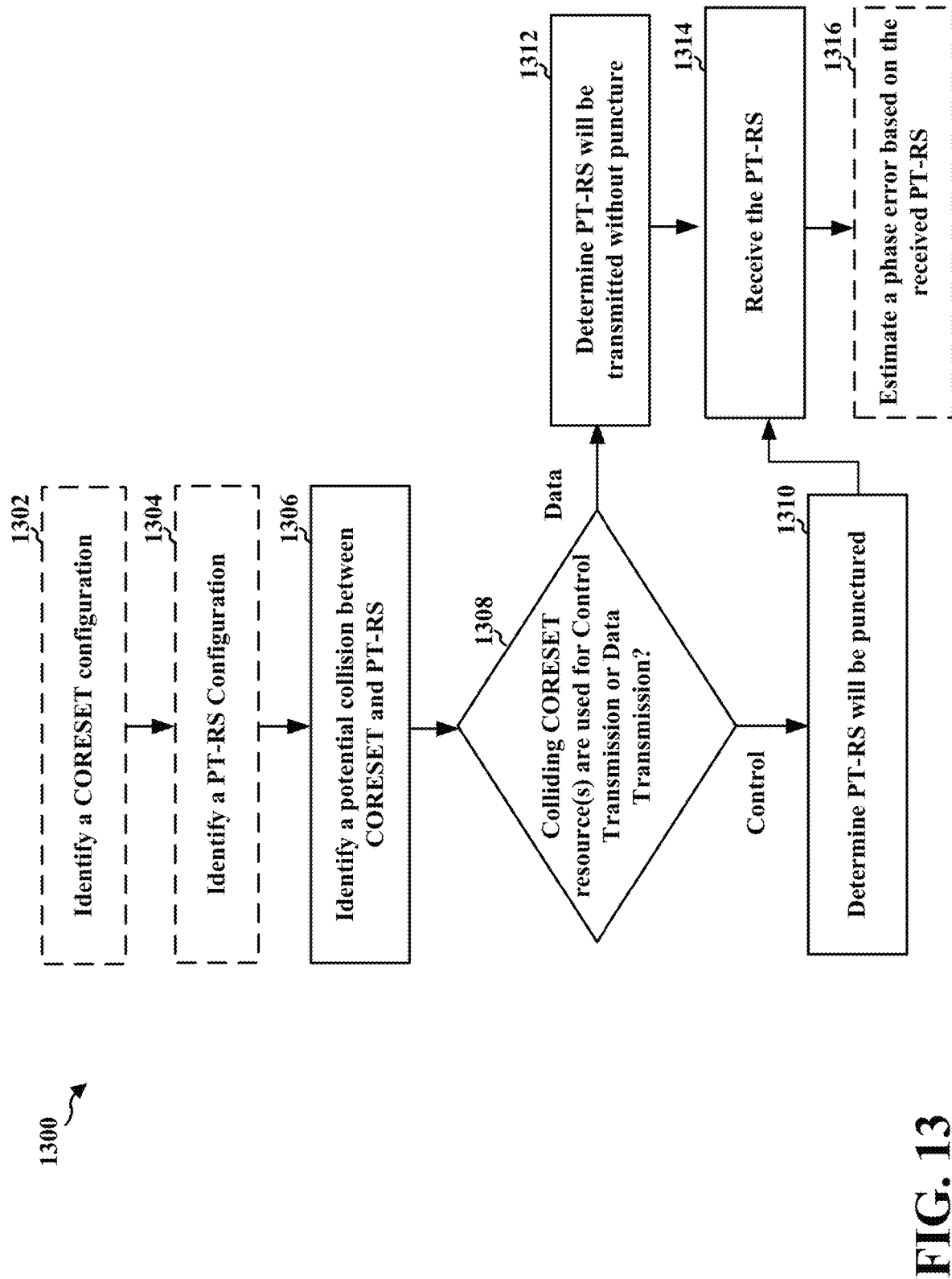
FIG. 13 is a flowchart of a method of wireless communication.

FIG. 13 is a flowchart 1300 of a method of wireless communication. The method may be performed by a receiver, such as a UE (e.g., UE 104, 350, 404, 902, 1150, the apparatus 1402, 1402') in wireless communication with a transmitter, such as a base station (e.g., base station 102, 180, 310, 402, 904, 1450, the apparatus 1102, 1102'). The communication may comprise, e.g., 5G/NR wireless communication. Aspects of the method help to use resources for control in an efficient manner while avoiding unnecessary reduction in PT-RS and degradation in phase tracking.

At 1306, the receiver identifies a potential collision between a first set of resources configured for a CORESET for the receiver and a second set of resources configured for a PT-RS for the receiver. FIGS. 7 and 8 illustrate examples of potential collisions between PT-RS and CORESET. The transmitter may identify a CORESET configuration at 1302 and may identify a PT-RS configuration at 1304. The CORESET configuration may indicate a location of the first set of resources configured for the CORESET and whether individual resources within the first set of resources are scheduled for and/or used for the control transmission (e.g., PDCCH scheduling PDSCH for the receiver) or the data transmission (PDSCH). The potential collision may be identified based on the CORESET configuration and the PT-RS configuration.

At 1308, the receiver may determine whether colliding resources in the first set of resources configured for the CORESET are configured for and/or used for a control transmission (e.g., PDCCH) or a data transmission (e.g., PDSCH). For instance, the determination may be based on blind decoding all potential candidate locations for a control transmission in the first set of resources configured for the CORESET, and determining if any control transmission is intended for the receiver, e.g. by detecting if a unique sequence of the receiver is used to scrambling the CRC of the bits associated with a blindly decoded control information.

Then, the receiver may determine, at 1310/1312, whether the PT-RS will be punctured based on the determination of whether the colliding resources in the first set of resources are configured for and/or used for the control transmission or the data transmission. The receiver may determine that the PT-RS for the receiver will be punctured, at 1312, when the colliding resources in the first set of resources configured for the CORESET for the receiver are configured for the control transmission. For example, the receiver may detect a PDCCH for the receiver in the colliding resources. The receiver may determine, at 1310, that the PT-RS will be transmitted without puncturing when the colliding resources configured for the CORESET are configured for/used for the data transmission. Thus, the receiver determines that the PT-RS will be punctured only for resource blocks of the CORESET colliding with the control transmission (e.g., detected PDCCH) without the PT-RS being punctured over an entire set of the colliding resources configured for the CORESET, e.g., as illustrated in the example of FIG. 8.

At 1314, the receiver may receive the PT-RS based on the identified set of resources configured for the PT-RS and the determination regarding whether the PT-RS will be punctured At 1316, the receiver may estimate a phase error based on the received PT-RS and the determination whether the PT-RS will be punctured. Thus, the receiver may use its identification of PT-RS that will be punctured to more accurately estimate phase error to enable the receiver to correct phase error and reduce decoding errors for received data. In one example, if all the PTRS tones in a symbol are punctured, the UE may estimate the phase error of this symbol by extrapolating the estimations at subsequent symbols. In another example, if a fraction of PTRS are punctured, then the UE may estimate the phase error based on the remaining PTRS. For example, the UE can use the determination of PT-RS that will be punctured so that the UE does not estimate the phase error based on the received symbols at the punctured PTRS tones.

Figure 14:
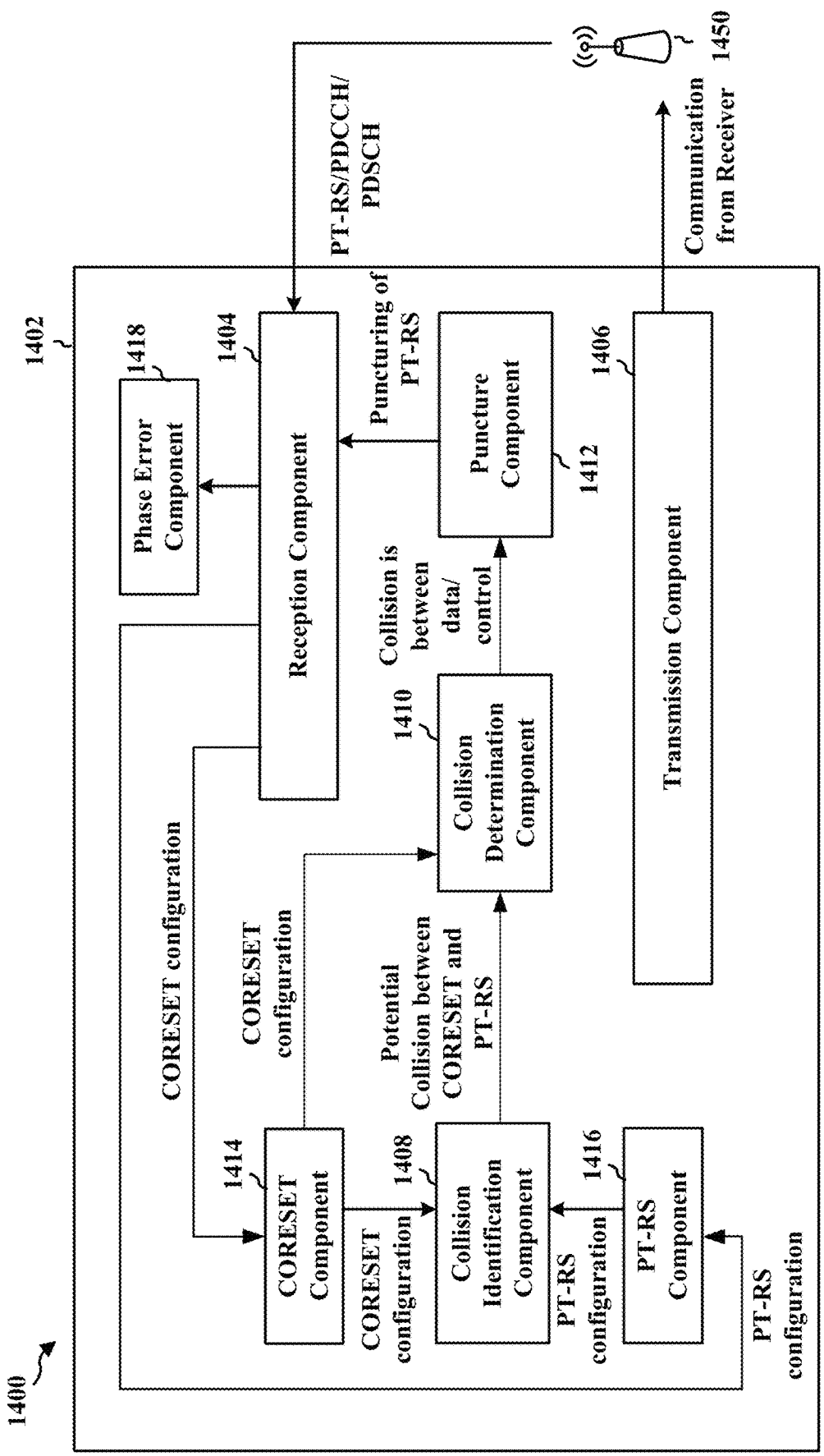
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a receiver, such as a UE (e.g., UE 104, 350, 404, 902, 1150) in wireless communication with a transmitter, such as a base station, (e.g., base station 102, 180, 310, 402, 904, 1450, the apparatus 1102, 1102'). The apparatus includes a reception component 1404 that receive communication from the transmitter, e.g., including downlink communication such as PDCCH, PDSCH, and PT-RS, as described in connection with FIGS. 9 and 13. The apparatus includes a transmitter component 1406 that transmits communication to the transmitter 1450.

The apparatus may include a collision identification component 1408 configured to a potential collision between a first set of resources configured for a CORESET and a second set of resources configured for a PT-RS, and a collision determination component 1410 configured to determine whether colliding resources in the first set of resources configured for the CORESET are configured for a control transmission or a data transmission. The apparatus may also include a puncture component 1412 configured to whether the PT-RS will be punctured based on the determination of whether the colliding resources in the first set of resources are configured for the control transmission or the data transmission. Thus, the reception component 1406 may the PT-RS based on the identified set of resources configured for the PT-RS and the determination, by the puncture component 1412, regarding whether the PT-RS will be punctured. The apparatus may further include a CORESET component 1414 configured to identify a CORESET configuration and a PT-RS component 1416 configured to identify a PT-RS configuration. The apparatus may include a phase error component 1418 configured to estimate a phase error based on the received PT-RS and the determination whether the PT-RS will be punctured.

The apparatus may include additional components that perform each of the blocks of the algorithm in the aforementioned flowcharts of FIGS. 9 and 13. As such, each block in the aforementioned flowcharts of FIGS. 9 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
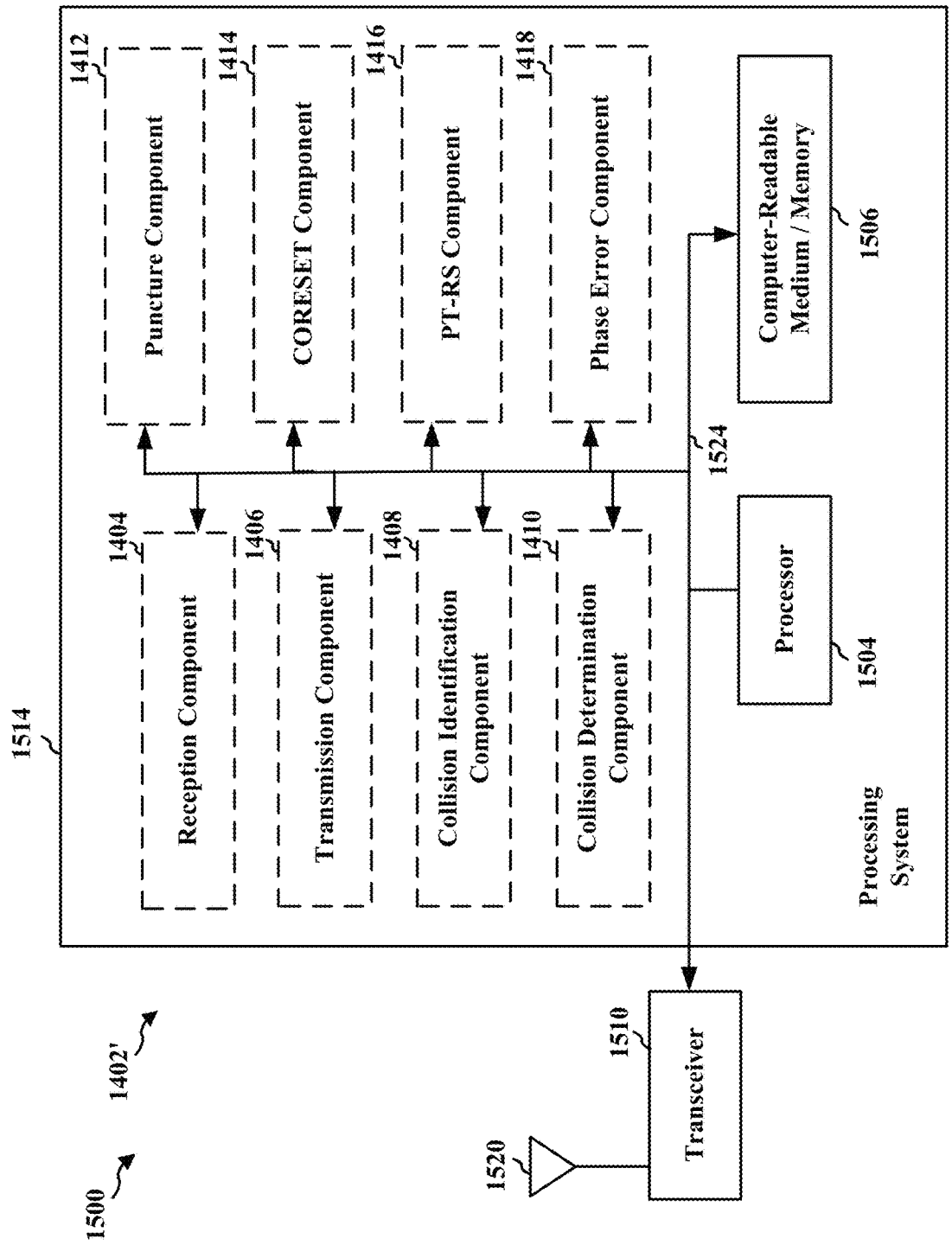
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, 1418, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416, 1418. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In one configuration, the apparatus 1402/1402' for wireless communication includes means for identifying a potential collision between a first set of resources configured for a CORESET and a second set of resources configured for a PT-RS (e.g., 1408), means for determining whether colliding resources in the first set of resources configured for the CORESET are configured for a control transmission or a data transmission (e.g., 1410), means for determining whether the PT-RS will be punctured based on the determination of whether the colliding resources in the first set of resources are configured for the control transmission or the data transmission (e.g., 1412), means for receiving the PT-RS based on the identified set of resources configured for the PT-RS and the determination regarding whether the PT-RS will be punctured (e.g., 1404), means for identifying a CORESET configuration (e.g., 1414), means for identifying a PT-RS configuration (e.g., 1416), and means for estimating a phase error 1418 based on the received PT-RS. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a transmitter, comprising:
    identifying a potential collision between a first set of resources configured for a Control Resource Set (CORESET) for a receiver and a second set of resources configured for a Phase Tracking Reference Signal (PT-RS) for the receiver; and
    puncturing the PT-RS based on when colliding resources in the first set of resources for the CORESET are configured for a control transmission; or
    transmitting the PT-RS without puncturing when the colliding resources configured for the CORESET are not used for the control transmission.

2. The method of claim 1, further comprising:
    determining whether the colliding resources in the first set of resources configured for the CORESET are configured for the control transmission or a data transmission, wherein the PT-RS is punctured based on a determination of whether the colliding resources in the first set of resources configured for the CORESET are configured for the control transmission or the data transmission.

3. The method of claim 2, wherein the control transmission comprises a physical downlink control channel (PDCCH) transmission.

4. The method of claim 2, wherein the data transmission comprises a physical downlink shared channel (PDSCH) transmission.

5. The method of claim 1, wherein the transmitter punctures the PT-RS only for resource blocks of the CORESET colliding with the control transmission without puncturing the PT-RS over an entire set of the colliding resources configured for the CORESET.

6. The method of claim 1, further comprising:
    identifying a CORESET configuration; and
    identifying a PT-RS configuration, wherein the potential collision is identified based on the CORESET configuration and the PT-RS configuration.

7. The method of claim 6, wherein the CORESET configuration indicates a location of the first set of resources configured for the CORESET and whether individual resources within the first set of resources are scheduled for the control transmission or the data transmission.

8. The method of claim 1, wherein the transmitter comprises a base station.

9. An apparatus for wireless communication at a transmitter, comprising:
    a memory; and
    at least one processor coupled to the memory and configured to:
        identify a potential collision between a first set of resources configured for a Control Resource Set (CORESET) for a receiver and a second set of resources configured for a Phase Tracking Reference Signal (PT-RS) for the receiver; and
puncture the PT-RS when colliding resources in the first set of resources configured for the CORESET are configured for a control transmission; or
transmit the PT-RS without puncturing when the colliding resources configured for the CORESET are not used for the control transmission.

10. The apparatus of claim 9, wherein the at least one processor is further configured to:
determine whether the colliding resources in the first set of resources configured for the CORESET are configured for the control transmission or a data transmission, wherein the PT-RS is punctured based on a determination of whether the colliding resources in the first set of resources configured for the CORESET are configured for the control transmission or the data transmission.

11. The apparatus of claim 9, wherein the transmitter punctures the PT-RS only for resource blocks of the CORESET colliding with the control transmission without puncturing the PT-RS over an entire set of the colliding resources configured for the CORESET.

12. The apparatus of claim 9, wherein the at least one processor is further configured to:
identify a CORESET configuration; and
identify a PT-RS configuration, wherein the potential collision is identified based on the CORESET configuration and the PT-RS configuration.

13. A method of wireless communication at a receiver, comprising:
identifying a potential collision between a first set of resources configured for a Control Resource Set (CORESET) for the receiver and a second set of resources configured for a Phase Tracking Reference Signal (PT-RS) for the receiver;
determining whether the PT-RS will be punctured based on whether colliding resources in the first set of resources configured for the CORESET are used for a control transmission; and
receiving the PT-RS based on the first set of resources configured for the PT-RS and a determination regarding whether the PT-RS will be punctured.

14. The method of claim 13, further comprising:
determining whether the colliding resources in the first set of resources configured for the CORESET are configured for the control transmission or a data transmission.

15. The method of claim 14, wherein the receiver determines that the PT-RS will be punctured when the colliding resources in the first set of resources configured for the CORESET are configured for the control transmission, and wherein the receiver determines that the PT-RS will not be punctured when the colliding resources configured for the CORESET are configured for the data transmission.

16. The method of claim 14, wherein the control transmission comprises a physical downlink control channel (PDCCH) transmission.

17. The method of claim 14, wherein the data transmission comprises a physical downlink shared channel (PDSCH) transmission.

18. The method of claim 13, wherein the receiver determines that the PT-RS will be punctured only for resource blocks of the CORESET colliding with the control transmission without the PT-RS being punctured over an entire set of the colliding resources configured for the CORESET.

19. The method of claim 13, further comprising:
identifying a CORESET configuration; and
identifying a PT-RS configuration, wherein the potential collision is identified based on the CORESET configuration and the PT-RS configuration.

20. The method of claim 19, wherein the CORESET configuration indicates a location of the first set of resources configured for the CORESET and whether individual resources within the first set of resources are scheduled for the control transmission or the data transmission.

21. The method of claim 13, wherein the receiver comprises a user equipment.

22. The method of claim 13, further comprising:
estimating a phase error based on the PT-RS and the determination regarding whether the PT-RS will be punctured.

23. An apparatus for wireless communication at a receiver, comprising:
a memory; and
at least one processor coupled to the memory and configured to:
identify a potential collision between a first set of resources configured for a Control Resource Set (CORESET) for the receiver and a second set of resources configured for a Phase Tracking Reference Signal (PT-RS) for the receiver;
determine whether the PT-RS will be punctured based whether colliding resources in the first set of resources configured for the CORESET are used for a control transmission; and
receive the PT-RS based on the first set of resources configured for the PT-RS and a determination regarding whether the PT-RS will be punctured.

24. The apparatus of claim 23, wherein the at least one processor is further configured to:
determine whether the colliding resources in the first set of resources configured for the CORESET are configured for the control transmission or a data transmission.

25. The apparatus of claim 24, wherein the receiver determines that the PT-RS will be punctured when the colliding resources in the first set of resources configured for the CORESET are configured for the control transmission, and wherein the receiver determines that the PT-RS will not be punctured when the colliding resources configured for the CORESET are configured for the data transmission.

26. The apparatus of claim 24, wherein the receiver determines that the PT-RS will be punctured only for resource blocks of the CORESET colliding with the control transmission without the PT-RS being punctured over an entire set of the colliding resources configured for the CORESET.

27. The apparatus of claim 24, wherein the at least one processor is further configured to:
identify a CORESET configuration; and
identify a PT-RS configuration, wherein the potential collision is identified based on the CORESET configuration and the PT-RS configuration.

28. The apparatus of claim 24, wherein the at least one processor is further configured to:
estimate a phase error based on the PT-RS and the determination whether the PT-RS will be punctured.

* * * * *